(12) United States Patent
Dunford

(10) Patent No.: US 7,219,910 B2
(45) Date of Patent: May 22, 2007

(54) ENGINE STEP

(75) Inventor: E. Bradley Dunford, 2703-4th Avenue NW, Calgary, Alberta (CA) T2N 0P6

(73) Assignee: E. Bradley Dunford (CA)

( * ) Notice: Subject to any disclaimer, the term of this patent is extended or adjusted under 35 U.S.C. 154(b) by 0 days.

(21) Appl. No.: 10/202,362

(22) Filed: Jul. 24, 2002

(65) Prior Publication Data

US 2004/0017057 A1    Jan. 29, 2004

(51) Int. Cl.
*B60R 3/00* (2006.01)

(52) U.S. Cl. .................................... 280/163; 182/127

(58) Field of Classification Search ............. 280/163, 280/164.1, 164.2, 169; 182/90, 93, 94, 115, 182/116, 127
See application file for complete search history.

(56) References Cited

U.S. PATENT DOCUMENTS

| | | | | |
|---|---|---|---|---|
| 2,056,229 A * | 10/1936 | Blomberg | ................ | 105/35 |
| 2,299,420 A * | 10/1942 | Essl | ................ | 105/35 |
| 2,378,678 A * | 6/1945 | Anderson | ................ | 182/150 |
| 2,713,831 A * | 7/1955 | Dahlstrand | ................ | 105/36 |
| 2,957,541 A * | 10/1960 | Everest et al. | ................ | 182/115 |
| 3,378,278 A * | 4/1968 | Froitzheim et al. | ........ | 280/163 |
| 3,698,330 A * | 10/1972 | Krombach | ................ | 108/44 |
| 3,734,534 A | 5/1973 | Brooks, Jr. et al. | ........ | 280/163 |
| 3,862,604 A * | 1/1975 | Pelabon | ................ | 105/61.5 |
| 3,865,210 A * | 2/1975 | Von Fummetti et al. | ... | 180/69.2 |
| 3,897,084 A | 7/1975 | Bergskoog | ................ | 280/166 |
| 4,159,122 A | 6/1979 | Stevens | ................ | 280/166 |
| 4,193,468 A * | 3/1980 | Riddle et al. | ........ | 180/89.17 |
| 4,462,485 A | 7/1984 | Terry et al. | ................ | 182/84 |
| 4,800,987 A * | 1/1989 | Liles | ................ | 182/92 |
| 4,911,264 A | 3/1990 | McCafferty | ................ | 182/92 |
| 5,088,960 A * | 2/1992 | Stickler et al. | ........ | 460/80 |
| 5,133,429 A * | 7/1992 | Densley | ................ | 182/150 |
| 5,265,896 A | 11/1993 | Kravitz | ................ | 280/163 |
| 5,456,479 A | 10/1995 | Conger | ................ | 280/165 |
| 5,669,463 A * | 9/1997 | Robertson | ................ | 182/116 |
| 5,716,064 A | 2/1998 | Frerichs | ................ | 280/166 |
| 5,842,709 A | 12/1998 | Maccabee | ................ | 280/166 |
| 5,897,125 A | 4/1999 | Bundy | ................ | 280/166 |
| 6,029,989 A | 2/2000 | Stuart et al. | ........ | 280/163 |
| 6,099,007 A | 8/2000 | Stuart et al. | ........ | 280/163 |
| 6,179,312 B1 * | 1/2001 | Paschke et al. | ........ | 280/166 |
| 6,267,062 B1 * | 7/2001 | Hamilton, Jr. | ........ | 105/26.05 |
| 6,397,759 B1 * | 6/2002 | Hubert et al. | ........ | 105/26.05 |
| 6,550,578 B1 * | 4/2003 | Law et al. | ................ | 182/150 |
| 6,578,667 B2 * | 6/2003 | Weneck et al. | ........ | 182/178.1 |

* cited by examiner

*Primary Examiner*—Christopher Bottorff
(74) *Attorney, Agent, or Firm*—Akerman & Senterfitt; Stephan A. Pendorf

(57) ABSTRACT

An apparatus comprises in combination, an engine compartment having an engine with related engine components, and a step or series of steps. The step is securely mounted in a manner for supporting the weight of a person. The step is adapted with a non-slip upwardly facing surface for standing on is positioned for enablement of proximity positioning of a person for applying maintenance to the engine and related engine components.

8 Claims, 1 Drawing Sheet

ENGINE STEP

BACKGROUND OF INVENTION

1. Field of Invention

This invention relates generally to large engines and more particularly to a step arrangement used in conjunction with a large engine for use in gaining access to key maintenance points in the engine bay.

2. Description of Prior Art

The following art defines the present state of this field:

Brooks, Jr. et al., U.S. Pat. No. 3,734,534 describes an automotive vehicle having an access door above a front wheel, a removable step assembly located at the center of a front wheel and mounted to the front spindle of the automobile's wheel. There is a first mounting member comprising an extension nut, which is threaded onto and locked to the front spindle. At the outer end of the extension nut is a hexagonal locking head connected by a neck portion of reduced diameter. The removable step has at its inner end a locking member comprising a pair of downwardly extending arms which reach around the neck of the extension nut, and is formed with a locking recess which mates with the locking head. A spring member mounted to the step adjacent the two locking arms holds the step in place and prevents any rattling of the step. A locking tab secures the extension nut to the automobile's front spindle.

Bergskoog, U.S. Pat. No. 3,897,084 describes a truck box access apparatus adapted to be mounted along the inside of the lower sill of the truck body comprising a pair of spaced vertical parallel support bars having brackets at one end of each of the bars for mounting the apparatus along the inside of the lower sill of a truck body. A pair of crossbars is disposed at the other end of each of the support bars. The cross bars extend between the support bars and are spaced from each other. A step platform is slidably supported between the crossbars and between first and second extreme positions. The step platform in its first extreme position extends outwardly from the support bards and at a right angle thereto and in its second position is nested flush between the bars.

Stevens, U.S. Pat. No. 4,159,122 describes a folding step for vehicles, and specifically for use on the front bumpers of large semitrailer tractors. The step is used for servicing the vehicles, for example, cleaning the windshield and the like and yet will permit the step to be folded up very quickly for transport position. It also may be used as an entrance step for vehicles. The step automatically locks under spring pressure in either its usable or stored positions, and thus minimum time is utilized in operating the step, and safety is enhanced.

Dignan, U.S. Pat. No. 4,462,485 describes a new and improved folding step especially useful on trucks or rail transit vehicles. The folding step includes a support bracket, a step member pivoted to the bracket, and a spring urging the two together and into one of two pivoted positions. The step member has parallel arms that straddle a box-like portion of the bracket. Stub shafts extend from the arms into the bracket through slots and carry cams that are urged into contact with the bracket by the spring. The cams and spring provide an over-center snap action between the step member and bracket.

McCafferty, U.S. Pat. No. 4,911,264 describes a portable step cooperative with the bumper and wheel of large automotive vehicles for use by mechanics, drivers, and service personnel in achieving access to windshields, windows, and engine compartments for servicing: comprising frame means to hang upon and press against a bumper or a large tire with a step means attached thereto and in various forms in a fixed configuration, or in a collapsible configuration, with means to hang upon a mechanic's tool box or to be stowed within a truck, bus, or the like directly, the step being formed of slip resistant material and provided with adjustable stops for proper alignment for use upon a bumper or tire, with an adapter for use on a tire integrally or separately provided.

Kravitz, J. S. U.S. Pat. No. 5,265,896 describes a retrofit, motor vehicle step kit which easily mounts to a motor vehicle regardless of the motor vehicle's make and model. The step kit comprises a step body, two L-shaped brackets, two stiffening members and four nuts. The kit further includes three bolts for connecting the step body to a motor vehicle body and three adaptor brackets for use with trucks having a model year of 1991 or later. A first section of each L-shaped bracket is attached to a motor vehicle frame while a second section of each bracket engages an associated one of the stiffening members. A first of the end portions of each stiffening member engages its associated one of the brackets while a second of the end portions is connected to a support receptacle of the step body. Once the brackets are properly corrected to the motor vehicle frame, the effective length of the stiffening members are adjusted with the nuts to level the step body and the step body is connected to the motor vehicle body, thereby allowing the step to support the weight of a person.

Conger, U.S. Pat. No. 5,456,479 describes a compactable access step for use with vehicles to make it easier for a person to reach into the engine compartment and radiator compartment of the vehicle and including a platform for a user to stand on and support means allowing the vehicle to be suspended from either a vehicle bumper or a vehicle wheel.

Frerichs, U.S. Pat. No. 5,716,064 describes a truck bed pull out step system installed under the front of a passenger pickup truck bed on one or both sides giving the user the ability to enter the pickup bed area or retrieve items with ease. When not in use the step is concealed under pickup bed.

MacCabbee, U.S. Pat. No. 5,842,709 describes a retractable step assembly including a step pinned to the lower ends of a pair of swing arms depending downwardly from a bracket for mounting the step assembly to the underside of a vehicle. An electric motor powers the upper end of a swing arm to rotate the two swing arms between retracted and extended positions. A clutch assembly is interposed between the electric motor and the swing arm to allow the motor to continue to operate to the end of its cycle if the step or swing arm become obstructed A lack assembly is provided to lock the step in retracted position, with the lock being automatically disengaged when the step assembly is actuated to extend the step from retracted position.

Bundy, U.S. Pat. No. 5,807,125 describes a truck step securable to a vehicle via a mounting bracket an having a step arm capable of swiveling between a "storage" position underneath the vehicle and an "in use" position where the step arm extends outward from under the vehicle. A distal end of the step arm is provided with a step plate where a user's foot may be placed when stepping into the vehicle, and a proximal end of the step arm is provided with a lower swivel plate, which swivels relative to an upper swivel plate provided on the mounting bracket. The lower and upper swivel plates have mating valleys and ridges to lock the step in one of several positions.

Stuart et al., U.S. Pat. No. 6,029,989 describes an apparatus for providing access steps to a vehicle and a method of installing same on a heavy or medium duty truck. In its most basic form, the apparatus is comprised of an access step and two step brackets. The brackets are installed to outer surfaces of the tank straps, which hold a fuel ran to a frame rail of the vehicle. The access step and step brackets have tabs and flaps or slots, which can be combined to attach the access step to the step brackets with a reduced number of fasteners.

Stuart et al., U.S. Pat. No. 6,099,007 describes an apparatus for providing access steps to a vehicle and a method of installing same on a heavy or medium duty truck. In its most basic form, the apparatus is comprised of an access step and two step brackets. The brackets are installed to outer surfaces of the tan straps, which hold a fuel tank to a frame rail of the vehicle. The access step and step brackets have tabs and flaps or slots, which can be combined to attach the access step to the step brackets with a reduced number of fasteners.

In addition to the above styles of step devices, the prior art teaches the use of stands and scaffolds for gaining access to large engines, whether in bays in cars and trucks or in stationary installations, but especially large engines in large vehicles as used for earth moving such as loaders and such.

The present invention fulfills these needs and provides further related advantages as described in the following summary.

SUMMARY OF THE INVENTION

The present invention teaches certain benefits in construction and use which give rise to the objectives described below.

An embodiment of the apparatus comprises in combination, a vehicle engine compartment having an automotive engine with related engine components, a fire wall, and a step. The step is securely mounted in a manner for supporting the weight of a person. The bracket is adapted with a non-slip upwardly facing surface for standing on and is positioned for enablement of proximally positioning a person for performing service or maintenance to the engine and related engine components and higher elevated parts of the vehicle, for example a truck's windshield.

A primary objective of the present invention is to provide an apparatus and method of use of such apparatus that provides advantages not taught by the prior art.

Another objective is to provide such an invention capable of being permanently or temporarily mounted in an engine compartment for use in performing maintenance.

A further objective is to provide such an invention capable of being positioned at selected heights.

A still further objective is to provide such an invention capable of interlocking for enabling secure footing while being used and especially when reaching laterally.

It is to be noted that other embodiments of the apparatus of this invention are to engine or engine compartment components or enclosure walls for engines including engines which are not powering vehicles, such as (for example and not by way of limitation) stationary engines powering generation plants or other things.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
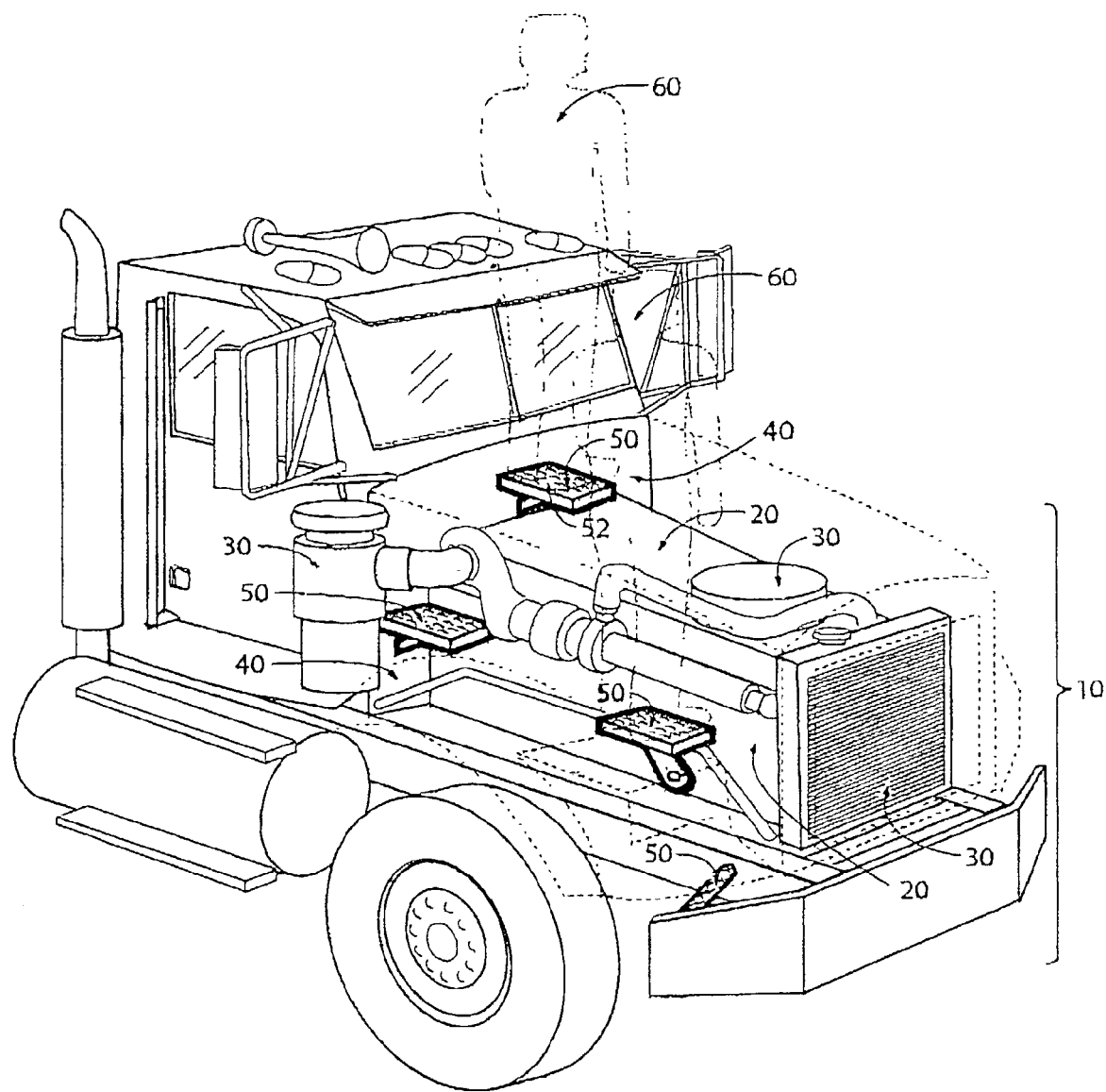
FIG. 1 is a perspective view of the front end of a vehicle showing a preferred embodiment of the in invention.

The above described drawing figures illustrate the invention in at least one of its preferred embodiments, which is further defined in detail in the following description.

A preferred embodiment of the present invention is an apparatus comprising a combination. A vehicle engine compartment 10 having an automotive engine 20 with related engine components 30 is positioned adjacent to a fire wall 40 as shown in FIG. 1. A step 50 is securely mounted in a manner for supporting the weight of a person. The mounting may be to the fire wall 40 using hardware fasteners or by straps or any other well known means, or may be mounted by attachment means to any of the components 30 such as springer shocks, mounting brackets fluid or air reservoirs, bumper or fender mounts or brackets, radiators, generators, body mounts or parts, or enclosures, or other similar non-moving components, whether within the engine compartment or not, or to the engine itself 20, as desired, for reaching a part of the engine compartment 10 for convenience in sitting or standing while working. The step 50 is adapted with a non-slip upwardly facing surface 52 for standing on and is positioned for enablement of proximally positioning a person for applying maintenance or service to the engine un related engine components and other elevated parts of the vehicle or thing to which the engine is mounted.

Preferably, the non-slip surface 52 comprises an embossment pattern, and which may be formed of "expanded metal" step material commonly found in most metalworking and fabrication shops. The step 50 is attached to the engine block 20, most typically by being bolted to existing or pre-installed mounting points on the engine's block 20 or to the firewall 40. The combination in use typically includes at least one further of the steps 50 within the engine compartment to act as a sort of ladder or series of steps for increasing the net height of the operator 60 so that the operator or user 60 may reach to a higher position within the engine compartment 10 or the thing to which the engine is attached.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed:

1. An apparatus comprising in combination:
    an engine compartment of a truck having an engine with related engine components, and
    a first step directly mounted to the engine or formed as an integral part of the engine, the first step securely positioned in a manner for supporting the weight of a person during servicing of the engine, said step also positioned in a manner which does not interfere with ordinary operation of the engine while not being serviced.

2. The apparatus of claim 1, wherein the first step's upwardly facing surface is provided with a non-slip surface formed of expanded metal or embossed patterns on said surface.

3. The apparatus of claim 1, wherein the engine is a vehicle's engine and the first step is positioned to enable a person servicing the vehicle to reach components of the vehicle or the engine.

4. The apparatus of claim 1, further comprising at least one second step to function as a ladder in combination with the first step.

5. The apparatus of claim 4, wherein the second step comprises at least two steps.

6. The apparatus of claim 1, wherein the step includes an upwardly facing surface.

7. A truck comprising in combination:
   an engine compartment having an engine with related engine components,
   an engine cowling covering said engine when in a closed position and removable to provide access to said engine, and
   a first step directly mounted to the engine or formed as an integral part of the engine, said first step securely positioned in a manner for supporting the weight of a person during servicing of the engine, said first step also positioned in a manner which does not interfere with ordinary operation of the engine while not being serviced, and said first step not contacting the cowling when the cowling is in the closed position.

8. A large highway or roadway based vehicle, comprising in combination:
   a hood,
   an engine compartment having an engine with related engine components, and
   a first step mounted on, built into or molded to the engine under the hood, said first step securely positioned in a manner for supporting the weight of a person during servicing of the engine, said first step also positioned in a manner which does not interfere with ordinary operation of the engine while not being serviced.

\* \* \* \* \*